No. 714,043. Patented Nov. 18, 1902.
F. B. SEITZ.
TRIPOD SUPPORT.
(Application filed Oct. 28, 1901.)
(No Model.) 2 Sheets—Sheet 2.
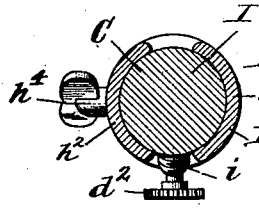
Fig. 5.
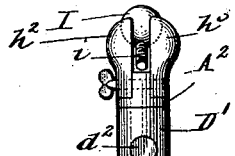
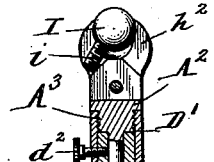
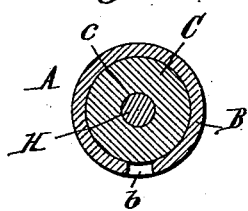
Fig. 6.
Fig. 9.
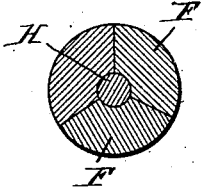
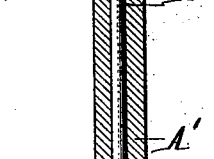
Fig. 11.
Fig. 12.
Fig. 7.
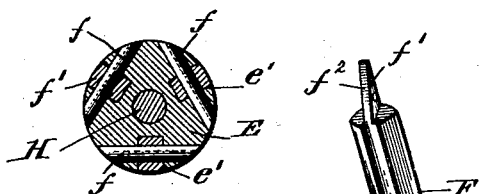
Fig. 10.
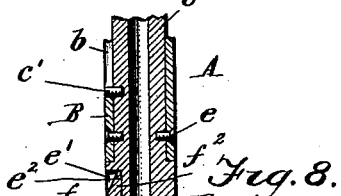
Fig. 8.
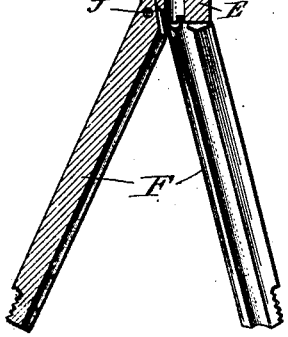
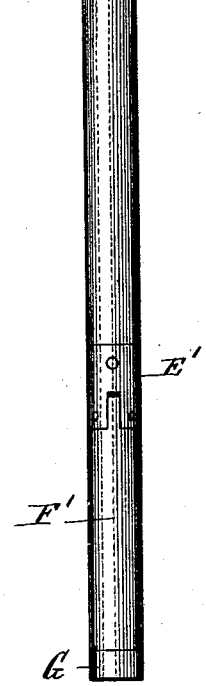
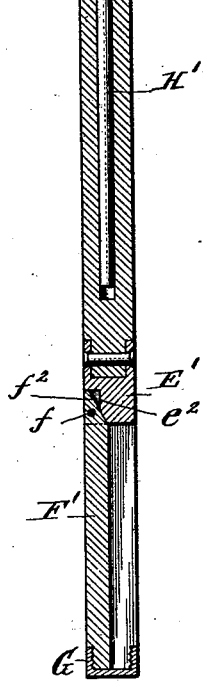
R. Chamberlain.
Charles Disher
} Witnesses.
Frank B. Seitz, Inventor.
By Newhart Burkhart
Attorneys.

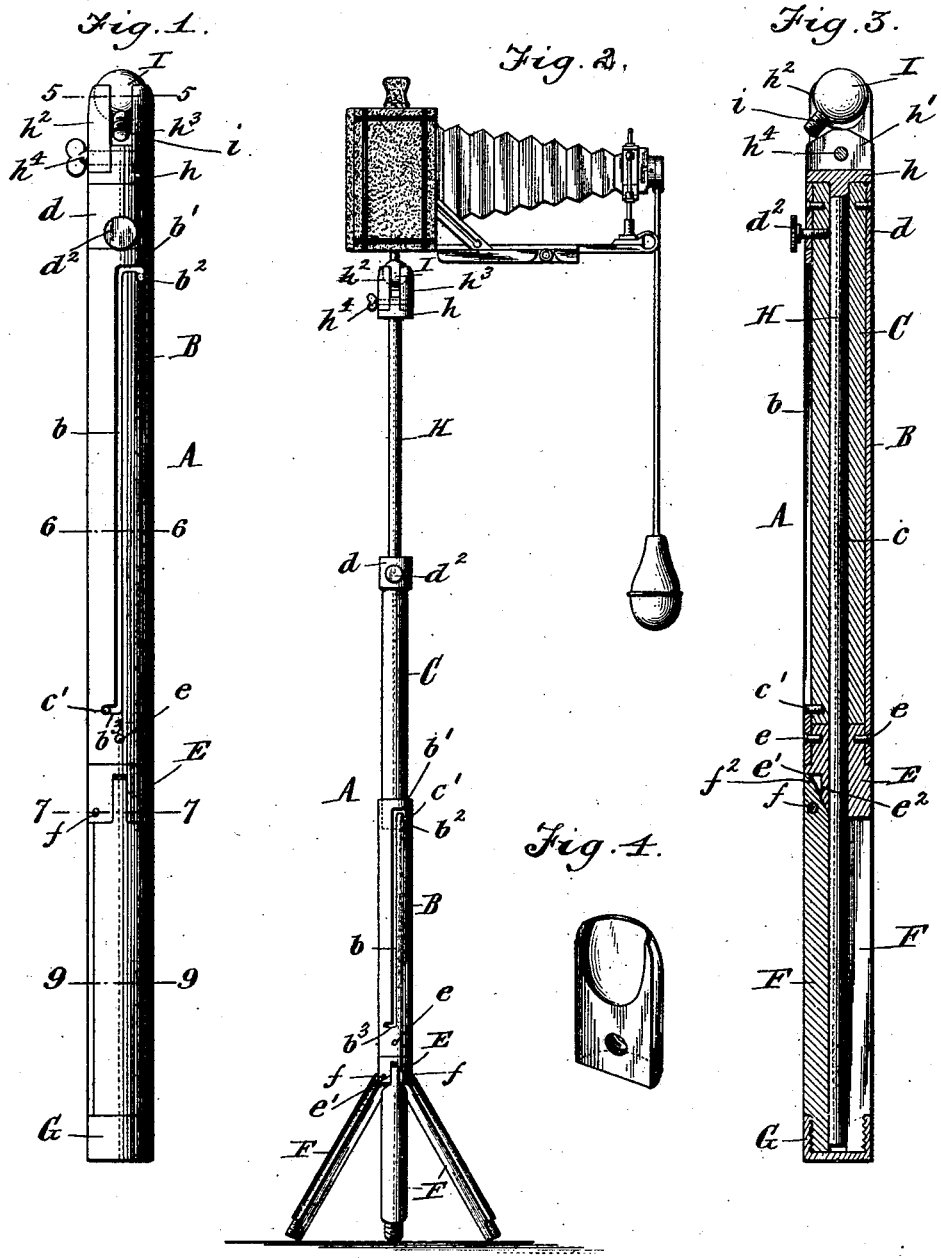

UNITED STATES PATENT OFFICE.

FRANK B. SEITZ, OF BUFFALO, NEW YORK.

TRIPOD-SUPPORT.

SPECIFICATION forming part of Letters Patent No. 714,043, dated November 18, 1902.

Application filed October 28, 1901. Serial No. 80,363. (No model.)

*To all whom it may concern:*

Be it known that I, FRANK B. SEITZ, a citizen of the United States, residing at Buffalo, in the county of Erie and State of New York, have invented new and useful Improvements in Tripod-Supports for Cameras or other Purposes, which improvements are fully set forth in the following specification and accompanying drawings.

My invention relates to the construction of a tripod-stand which is particularly adapted for supporting a photographic camera, but which may be used advantageously as a stand for surveyor's or other observation instruments requiring adjustment in order to bring the same in proper position to take in any desired view or object in making the exposure in the case of a photographic instrument or the observation in the case of a surveyor's or other similar instrument; and the object of this invention is to provide a light, sightly, durable, and easily transportable device of this character which may be folded within a small compass and which is so constructed to enable the camera or other instrument to be adjusted in a universal manner upon its stand, so as to place the instrument at any desired angle and also to enable the operator to accurately level his instrument or, in other words, to bring the horizontal and vertical lines into proper rectangular relation.

The invention consists in the combination of elements or parts, as will be hereinafter described, and pointed out in the appended claims.

Referring to the drawings, Figure 1 is an elevation of my improved telescopic tripod-stand, showing the same in its collapsed or closed condition. Fig. 2 is a similar view of the same opened or extended ready for use. Fig. 3 is a central longitudinal section of the same in its collapsed or closed condition. Fig. 4 is a detached perspective view of one of the socket members. Fig. 5 is a cross-section taken on line 5 5, Fig. 1. Fig. 6 is a cross-section taken on line 6 6, Fig. 1. Fig. 7 is a similar section taken on line 7 7, Fig. 1. Fig. 8 is a fragmentary central longitudinal section of the lower portion of the stand, on an enlarged scale, the supporting-legs being extended. Fig. 9 is a cross-section on line 9 9, Fig. 1. Fig. 10 is a perspective view of one of the supporting-legs. Fig. 11 is a side elevation of my device in a modified form. Fig. 12 is a central longitudinal section of the same.

Referring now to the drawings in detail, like letters of reference refer to like parts in the several figures.

The letter A represents the body portion of the tripod-stand and consists of two telescopic tubes B C, the inner tube C having a longitudinal bore $c$ arranged centrally therein and a ferrule D secured at its upper end by means of studs or pins $d$. The outer tube B is provided with a longitudinal slot $b$, in which a pin or stud $c'$, embedded in the tube C, slides, the upper end of said longitudinal slot having a lateral extension $b'$, which terminates in a vertical extension $b^2$, the function of which is to keep the inner tube C elevated and prevent its turning in the tube B when the body portion is extended. The lower end of the slot $b$ terminates in a lateral extension $b^3$ and retains the inner tube C in its collapsed or closed position.

Secured in the lower end of the tube B by means of pins $e$ is a plug or casting E, to which three supporting-legs F are pivotally secured by means of pivot-pins $f$. Each supporting-leg has a flattened extension or ear $f'$, which enters one of the pockets $e'$, arranged in the plug or casting E, and the inner edge thereof is inclined, as at $f^2$, and strikes the inner side $e^2$ of the pocket in which it is held to limit the outward movement of the supporting-leg of which it forms a part, as shown in Fig. 8.

The legs when folded form a tubular body, each leg being in the form of a third of a tube, or sector shape in cross-section, and when brought together or folded are held in such position by an internally-threaded thimble or ferrule G, which receives the lower screw-threaded ends of the legs F, which are thereby retained in their closed condition.

H represents a vertically-slidable rod, which is adjustable in the inner tube C and has an enlargement or head $h$, which rests against the upper edge of the ferrule D when the device is closed or collapsed. A binding-screw $d^2$ enters the ferrule D and impinges against the rod H, which may be elevated or lowered to any desired point and retained in such position by the said binding-screw. The head H has an upwardly-projecting lug $h'$, on either side of which two socket members $h^2$ $h^3$ are secured by a binding-screw $h^4$. These socket members are exact counterparts and form a socket in which a ball I, having a threaded extension or stud $i$, is retained or clamped. This extension or stud is adapted to be screwed into a camera or other instrument to securely attach the same thereto. The upper edge of the lug $h'$ is inclined on either side of its center to permit the stud $i$ of the ball to swing between the two socket members, thus preventing projecting parts on the ball-and-socket head and also forming a convenient handle.

When the operator desires to accurately adjust the camera or other instrument to any desired angle or to level the same, the binding-screw $h^4$ is loosened. The ball I can then be turned in the socket to adjust the instrument so as to attain the desired angle or to bring the vertical and horizontal lines into exact rectangular relation.

When it is desired to transport or carry the tripod-stand, the camera or other instrument is detached from the threaded extension or stud $i$ and the binding-screw $h^4$ loosened to permit the ball I to be turned in the socket, so as to cause the stud or extension to rest on the lug $h'$ between the two socketed counterparts, as shown in Fig. 1, which figure shows the tripod-stand in its collapsed or closed condition.

In the modification shown in Figs. 11 and 12 the device is so constructed as to constitute a walking-stick when closed. In this instance a cylindrical body $A'$ is formed of one piece and has a longitudinal bore $A^2$ arranged centrally therein and extending from its upper end to a point near its lower end. It also has a ferrule $D'$ secured to its upper end in any well-known manner and another ferrule or casting $E'$ secured to its lower end. The upper half of the ferrule $D'$ is provided with internal screw-threads for a purpose to be presently disclosed. Secured to the lower ferrule or casting $E'$ are three supporting-legs $F'$, which are constructed similar to those shown in the preferred construction and when laid together appear as forming a continuation of the cylindrical body portion $A'$. A vertically-slidable rod $H'$ is adjustable in the cylindrical body portion $A'$ and has an enlargement or head $A^2$, which is provided with a threaded portion $A^3$, adapted to engage the internally-threaded portion of the ferrule $D'$ when the device is closed. This assures a secure connection of the parts when used as a cane. The other parts of the device are constructed exactly as shown in Figs. 1 to 5.

Having thus described my invention, what I claim is—

1. In a stand for supporting photographing or other instruments, the combination with the body portion, of a vertically-slidable rod held adjustable therein and being provided with a lug having its upper edge inclined on either side of its center, socket members arranged on opposite sides of said lug, a binding-screw passing through the socket members and the said lug, and a ball having a threaded stud held between said socket members, substantially as set forth.

2. A stand or support comprising a body portion, a vertically-slidable rod held adjustable in said body portion and having a lug at its upper end, socket members arranged on opposite sides of said lug, a binding-screw passing through the socket members and the said lug, a ball held between said socket members and having means for attachment to a superposed object, and supporting-legs pivotally secured to the said body portion, substantially as set forth.

3. A stand for supporting photographing or other instruments, comprising a body portion consisting of two telescopic tubes, the inner tube having a longitudinal bore arranged centrally therein and a laterally-projecting pin, the outer tube being provided with a longitudinal slot in which said pin slides, a casting secured to the lower end of said outer tube and having pockets therein, pivoted supporting-legs secured to said casting and each having a flattened extension at its upper end which enters one of said pockets, the inner edge of each extension being inclined and adapted to strike the inner side of the pocket in which it is confined to limit the outward movement of the supporting-leg of which it forms a part, a vertically-slidable rod held adjustable in the inner tube and having an enlargement at its upper end and a lug projecting from said enlargement, socket members held on either side of said lug, a binding-screw for holding said socket members on said lug, and a ball clamped between said socket members, substantially as set forth.

4. In a stand for supporting photographing or other instruments, the combination with the body portion, of a vertically-slidable rod held adjustable therein and having an enlargement at its upper end with a lug projecting centrally from the upper face thereof, socket members positioned on said head at opposite sides of said lug, a binding-screw passing through the socket members and the said lug, and a ball held between said socket members and having a threaded stud extending therefrom, substantially as set forth.

In testimony that I claim the foregoing I hereunto affix my signature this 2d day of October, 1901.

FRANK B. SEITZ.

Witnesses:
CHAS. F. BURKHART,
EMIL NEUHART.